Feb. 23, 1932.  H. FELDMEIER  1,846,096
PIPE FITTING
Filed Oct. 11, 1930
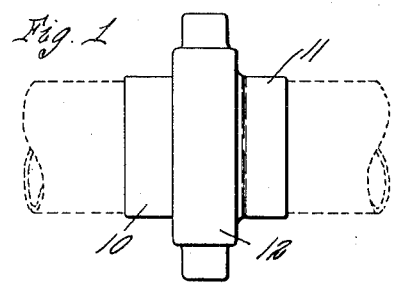
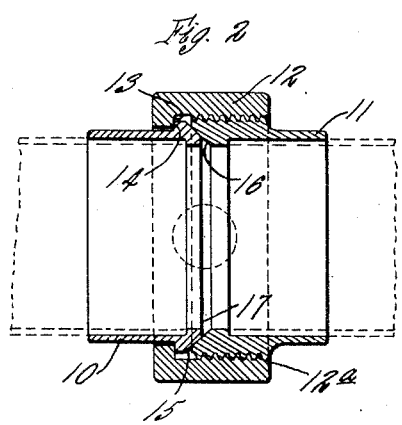
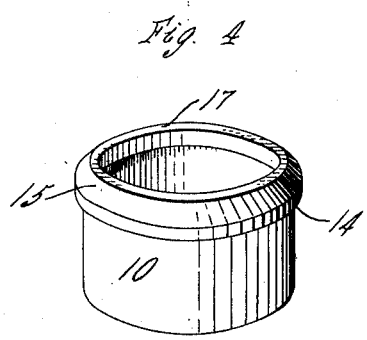
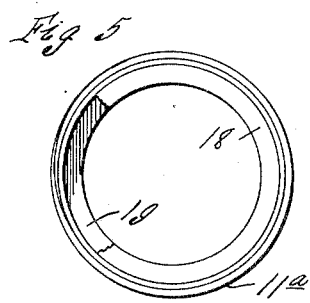
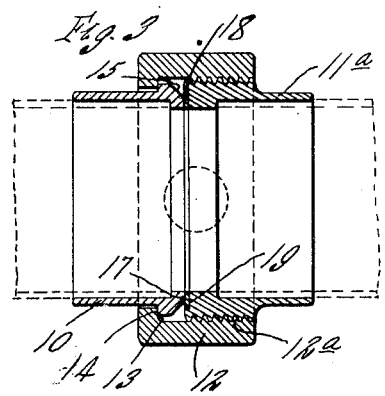
INVENTOR.
Harvey Feldmeier
by Parker & Prelnow
ATTORNEYS Patented Feb. 23, 1932

1,846,096

UNITED STATES PATENT OFFICE

HARVEY FELDMEIER, OF LITTLE FALLS, NEW YORK, ASSIGNOR TO CHERRY-BURRELL CORPORATION, OF WILMINGTON, DELAWARE, A CORPORATION OF DELAWARE

PIPE FITTING

Application filed October 11, 1930. Serial No. 488,021.

This invention relates to pipe couplings or unions for separably joining pipe or tube sections or fittings together with liquid-tight joints between the fittings or sections and enabling the ready disconnection or separation of the joined members.

Pipe couplings for separably joining tubular members are common, in which the tubular members are drawn together, as by a screw coupling sleeve, so as to clamp a soft or compressible gasket, for instance of rubber, between the members to form a liquid-tight joint between them. Unions are also known, in which the tubular members are similarly clamped together but with a metal-to-metal contact, or, that is, without an interposed compressible gasket between the members to form the liquid-tight joint, the tubular members in these latter unions ordinarily being provided with interfitting male and female bevelled faces which form the metal-to-metal joint.

The parts of unions employed in apparatus, such for example as milk handling or treating apparatus, where sanitary conditions are a prime consideration, have to be frequently disconnected for cleaning the parts to keep them thoroughly sanitary. For instance, in milk handling or treating apparatus, it is usual, in order to insure proper sanitary conditions, to disconnect and clean the parts of the unions after each run of the milk or use of the apparatus. Unions employing a rubber or the like compressible gasket to form the liquid-tight joint are not satisfactory for use in such apparatus because the gaskets, which are relatively expensive, deteriorate or become deformed so as to cause leaks, and they are apt to become unsanitary. Because of such considerations, the unions employed in such apparatus are therefore usually of the second type, in which the joint is formed by a metal-to-metal contact of the members, and in which no rubber or analogous soft gasket is employed. But the metal-to-metal joints are more or less liable to leak, due perhaps to misalinement of the parts or the bruising of the joint faces in the frequent handling, assembling and disconnection of the parts, and on this account a demand has recently arisen for unions or couplings employing paper gaskets to form the liquid-tight joints between the tubular members. The paper gaskets are desirable because they are inexpensive, and a new gasket is used each time the parts of the union are assembled. Paper gaskets, however, cannot be successively employed in the unions as heretofore ordinarily constructed with bevelled faces intended to form a metal-to-metal joint, and this means that in apparatus equipped with such unions, the unions must be replaced by unions of a different construction if the paper sealing gaskets are to be used.

One object of my invention is to provide a union or coupling of novel construction, which, with the minimum change and expense, is adapted to give either a metal-to-metal joint between the tubular members or to enable the use of paper gaskets for sealing the joints.

Other objects of the invention are to provide a pipe union in which the tubular members may be drawn together by the usual screw coupling member, but in which one of the tubular members is provided with a beveled joint-forming face and also with an additional transverse joint-forming face, thus adapting this same member to cooperate either with a second member having a complementary bevelled face to form a metal-to-metal joint, or with a second member constructed so that a paper or the like sealing gasket can be employed between the two tubular members; also to provide a pipe fitting or member having two different joint-forming faces, which adapt the member for use in a pipe union with either of two different forms of complementary pipe fittings or members, and also to provide a pipe union or coupling having the novel features of construction and advantages hereinafter described and set forth in the claim.

In the accompanying drawings:

Fig. 1 is a side elevation of a pipe union or coupling embodying my invention.

Fig. 2 is a longitudinal section, enlarged, thereof, showing the same adapted to provide a metal-to-metal joint between the connected members.

Fig. 3 is a similar view but showing the union adapted for use therewith of a paper or the like sealing gasket.

Fig. 4 is a perspective view of the male member or fitting of the union.

Fig. 5 is an end elevation of the complementary fitting or member of the union shown in Fig. 3.

Referring first to Figs. 1, 2 and 4, the coupling comprises two tubular members or fittings 10 and 11, and a screw coupling sleeve or member 12 which has a screw connection 12a with the member 11, and an annular flange or part 13 adapted to engage an annular shoulder 14 on the other member 10 so that the two members 10 and 11 are adapted to be drawn forcibly towards each other or may be disconnected by turning the coupling sleeve in one or the other direction on the member 11, in the usual manner. The members 10 and 11 are illustrated as being fittings adapted to be brazed or otherwise permanently secured on two pipe sections indicated by broken lines, but it will be understood that these members may be either pipe sections themselves or separate pipe fittings or other tubular members.

One of the tubular members, as the member 10, is provided at its inner end portion with an external bevelled joint-forming face 15 which is adapted to seat against a complementary, internal bevelled face 16 on the other tubular member 11, these complementary, bevelled faces being formed at an appropriate angle, for instance an angle of 45°, adapting a liquid-tight joint to be formed by the metal-to-metal contact of these bevelled faces when they are drawn tightly together by means of the coupling sleeve 12. In addition, the member 10 is also provided at is inner end with a second joint-forming face 17 which is of substantial radial width and is preferably flat. When the member 11 having the internal, bevelled seat 16, as shown in Fig. 2, is employed, the joint between the two members 10 and 11 is formed by the metal-to-metal contact of the bevel faces 15 and 16 of the two members, but the provision of the second face 17 on the member 10 adapts this member for use with a complementary tubular member 11a constructed as shown in Fig. 3, in which case the end face 17 of the member 10 is adapted to bear against the outer face of a sealing gasket 18 of paper or analogous, inexpensive material which is interposed between the inner ends of the two members 10 and 11a and is adapted to be clamped tightly between the two members to form a liquid-tight joint between them when the members are drawn together by means of the coupling sleeve. Preferably the member 11a is provided with an end recess or depressed seat 19 in which the gasket 18 is adapted to be seated and confined.

Thus, the tubular member 10 is adapted to cooperate either with a complementary tubular member 11 of the form shown in Fig. 2, which has a bevelled seat 16 for metal-to-metal contact with the bevelled face 15 of the member 10, or with a complementary tubular member 11a of the form shown in Fig. 3, which is intended for use with a sealing gasket 18 interposed between the two tubular members. Therefore, if an apparatus is equipped with unions or couplings constructed as shown in Fig. 2, in which the joint is formed by a metal-to-metal contact between the tubular members 10 and 11, and it is desired to employ paper or the like sealing gaskets, it is only necessary to replace the single member 11 of the coupling with a member 11a of the form shown in Fig. 3.

I claim as my invention:

A coupling element for use in connecting pipes end to end, comprising one sleeve having an annular, transverse end face of substantial area bordering the passage of the sleeve, and a male, beveled face surrounding said transverse face to cooperate with either of a pair of sleeves having passages of the same internal diameter as the passage of said one sleeve, one of which pair of sleeves has a transverse end seat abutting said transverse face of said one sleeve when those sleeves are drawn together endwise, and the other of which pair of sleeves has a female beveled end seat abutting the beveled face of said one sleeve when those sleeves are drawn together endwise, and means for drawing a selected one of said pair of sleeves endwise against one of said faces of said one sleeve.

HARVEY FELDMEIER.